United States Patent [19]

Howe

[11] 4,205,339
[45] May 27, 1980

[54] FRAME STORAGE AND RETRIEVAL WHEREIN THE FRAME FIELDS ARE QUADRATURE AMPLITUDE MODULATED ON A SINGLE CARRIER

[75] Inventor: Dennis G. Howe, Fairport, N.Y.

[73] Assignee: Eastman Kodak Company, Rochester, N.Y.

[21] Appl. No.: 926,174

[22] Filed: Jul. 20, 1978

[51] Int. Cl.² .............................................. H04N 5/76
[52] U.S. Cl. ............................. 179/100.1 G; 360/10; 360/35; 370/20; 358/128.5
[58] Field of Search .............................. 358/128, 302; 179/15 BC, 100.3 V, 100.4 ST; 360/10, 11, 135, 18, 29, 20, 35

[56] References Cited

U.S. PATENT DOCUMENTS

| | | | |
|---|---|---|---|
| 3,796,825 | 3/1974 | Redlich et al. ......................... | 358/128 |
| 3,849,776 | 11/1974 | Swynford-Lain .................. | 360/18 X |
| 3,931,457 | 1/1976 | Mes ........................................ | 358/128 |
| 3,991,283 | 11/1976 | Itoh et al. .................... | 179/100.4 ST |
| 4,064,538 | 12/1977 | Broussaud ............................. | 358/128 |
| 4,130,834 | 12/1978 | Mender et al. .................. | 358/302 X |

Primary Examiner—James W. Moffitt
Assistant Examiner—Donald E. McElheny, Jr.
Attorney, Agent, or Firm—Donald W. Strickland

[57] ABSTRACT

Method and apparatus for recording a frame, comprising two fields, of document information on a disc storage device are described. The video signals corresponding to the two fields are used to amplitude modulate quadrature components of a single carrier frequency, each field modulating its own quadrature component. The quadrature amplitude modulated (QAM) carrier components are vectorially combined, the resultant being then angularly modulated on a high frequency carrier which is recorded on the disc storage device. In a preferred embodiment, a frame of information is recorded on the disc storage device along a single closed circular track. The present invention also provides methods for playing back the single track of recorded information for field-sequential video display, hard copy reproduction by a dual-line printer, or hard copy reproduction by a line-sequential printer.

12 Claims, 7 Drawing Figures

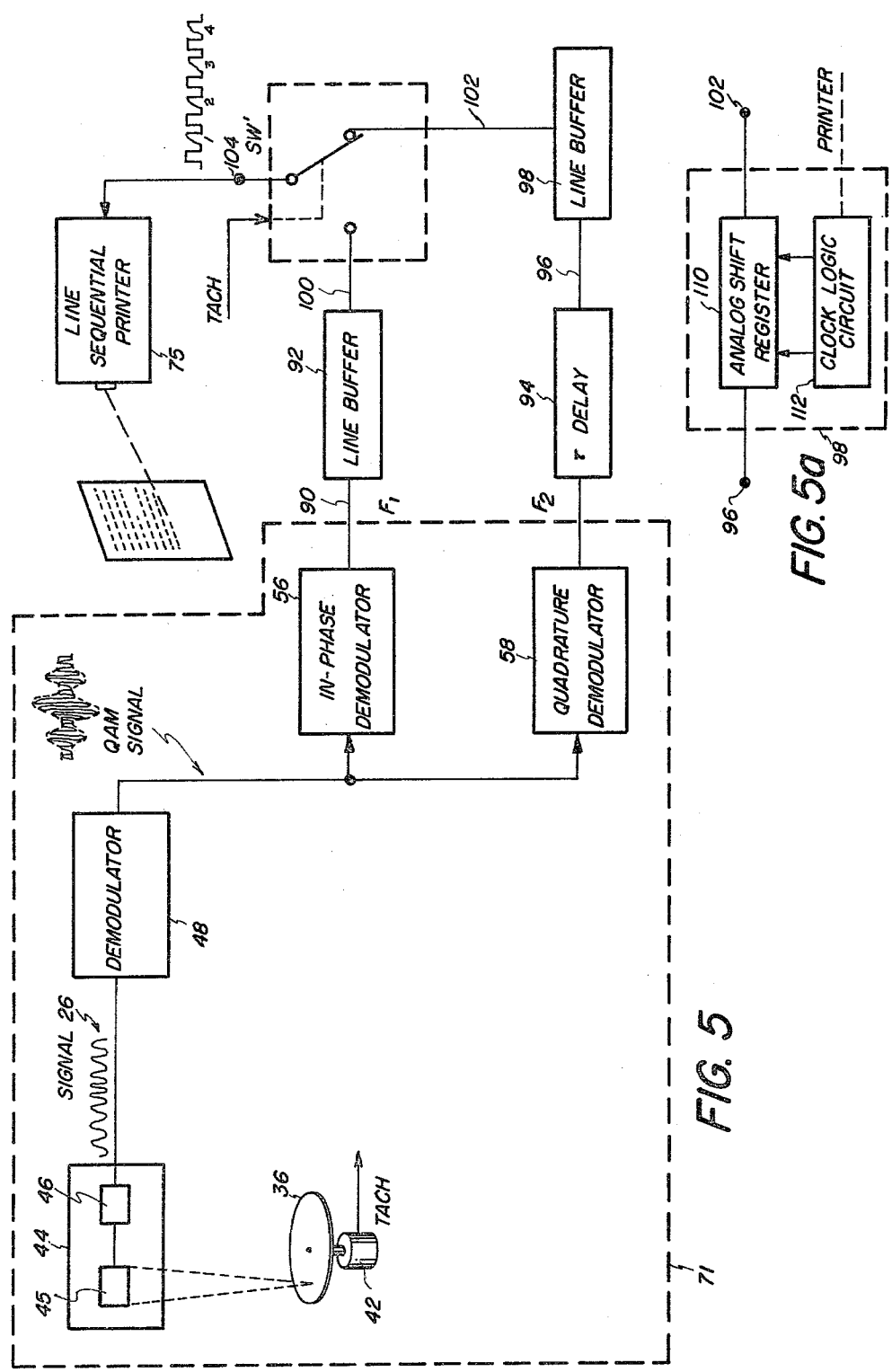

FRAME STORAGE AND RETRIEVAL WHEREIN THE FRAME FIELDS ARE QUADRATURE AMPLITUDE MODULATED ON A SINGLE CARRIER

BACKGROUND OF THE INVENTION

1. Field of the Invention

The present invention relates to document facsimile, or pictorial storage on a recording medium, and more particularly to a document information storage system providing either video display or hard copy reproduction of stored document information.

2. Description Relative to the Prior Art

It is known in the art to record video program material on a disc-shaped recording medium. Typically, the video program material is comprised of a series of sequential frames. Each frame comprises two sequential interlaced fields, i.e., an odd field containing the odd lines of video information (lines 1, 3, 5, . . .), and an even field containing the even lines of video information (lines 2, 4, 6, . . .). The information is commonly recorded in a circular or spiral record track configuration, with one frame, or one field, recorded per disc revolution.

The video disc represents a potentially valuable medium for document information storage applications. The information of each document (i.e., each page) can be recorded as a single frame of information. It is feasible, with present video disc technology, to store tens of thousands of document "frames" on a single side of a 300 mm (12 inch) diameter disc. Further, because of the manner in which discs are read, a random access system is possible wherein any one of the document frames stored on the disc could be located and displayed in seconds. There are certain problems peculiar to document frame storage, however, which inhibit the straightforward application of video discs to such storage.

In business system applications, i.e., where frames corresponding to documents such as bank checks and the like are to be stored, it is important to have both high storage capacity (many document frames stored per disc) and a useful storage format (one document frame stored per disc rotation so that individual still frame aquisition and video display of the stored document frames can be accomplished). A document frame storage system for business system applications should preferably provide the option of hard copy reproduction in addition to video display of the stored document frames. These two playback modes are somewhat incompatible because conventional video monitors require sequential field information (the odd field information and then the even field information), whereas many conventional printer devices require sequential line information (line 1 from the odd field, line 2 from the even field, line 3 from the odd field, and so on).

SUMMARY OF THE INVENTION

The present invention provides method and apparatus for storing document infomation on a recording medium, e.g. a disc. The disclosed method and apparatus provide an increased capacity storage system which records one frame per disc revolution. In addition, the document information storage system of the present invention has the versatility of providing either video display or hard copy reproduction of the stored document information while using only a single readout device. Such recording and versatility is attained generally as follows: Signals corresponding to the two fields which comprise a frame of document information amplitude modulate quadrature components of a carrier. The modulated components are vectorially added to produce a quadrature amplitude modulated (QAM) signal. In a presently preferred form of the invention, the QAM signal is angularly modulated onto a high frequency (HF) carrier. The modulated HF carrier is recorded on a recording disc which is so rotated during recording that one frame of document information is recorded per disc revolution. Method and apparatus are provided for playing back the recorded disc to produce a video display or a hard copy reproduction of the recorded information.

BRIEF DESCRIPTION OF THE DRAWINGS

In the detailed description of the preferred embodiments of the invention presented below, reference is made to the accompanying drawings, in which:

FIGS. 5 and 5a show circuits in block diagram form and illustrate the playback of recorded information for hard copy reproduction by a line-sequential printer.

DETAILED DESCRIPTION OF THE INVENTION

Conceptionally, the present invention can be divided into two parts: (1) recording document information on a recording disc, and (2) playing back the recorded document information for video display or hard copy reproduction.

Recording

The present invention provides a document information disc storage system which possesses the advantages of high storage capacity, storage of one document frame per disc revolution, and versatile disc readout. It is assumed that each document, the information of which is to be stored, is scanned by a camera or other device which converts the document information into an electrical signal. The electrical signal corresponding to each document can be formatted as a video signal in which a single frame is comprised of two interlaced fields, an odd-line field (field 1) and an even-line field (field 2). It will be apparent from the following description that the present invention has generally applicability to the recording and playing back (preferably with a single recording/playback head) of information formatted as either a field sequential signal, or a line sequential signal, etc. The invention, as described below, is cast in the environment of "optical disc recording" . . . and in particular in a recording environment in which the recording medium is recorded on by forming tiny information-bearing apertures in the medium.

Figure 1:
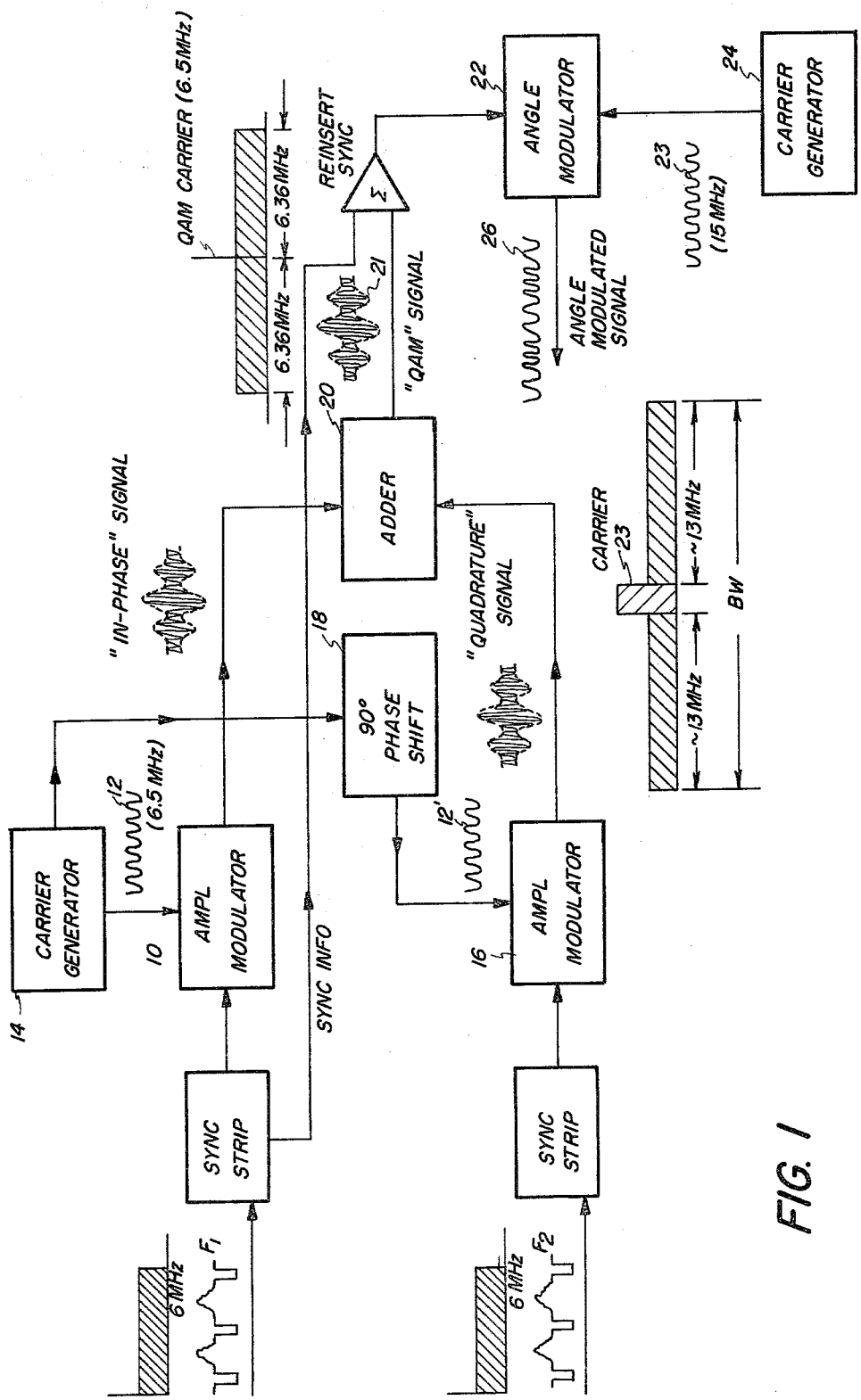
FIGS. 1 and 2 depict circuits in block diagram form and illustrate the present concept of recording document information on a recording disc.

Referring to FIG. 1, analog signals $F_1$ and $F_2$ correspond to the information content of field 1 (the odd-line frame) and field 2 (the even-line frame), respectively. For purposes of discussion it is assumed that the base bandwidth of signals $F_1$ and $F_2$ is less than or equal to 6.36 MHz, although the bandwidth may vary depending upon the particular application; it is further assumed that the $F_1$ and $F_2$ signals are in, or have been brought (by suitable scanning means or delay devices) into, time coherence. The signal $F_1$ (preferably stripped of sync) is applied to an amplitude modulator 10 to amplitude modulate a 6.5 MHz carrier 12 supplied by a generator 14. The output of the modulator 10 is an amplitude modulated signal referred to as the "in-phase" signal. The signal $F_2$ (also preferably without sync) is applied to an amplitude modulator 16 to amplitude modulate a carrier 12' which is of the same frequency as the carrier 12, but phase shifted 90° relative thereto (by a 90° phase shift device 18). The output of the modulator 16 is an amplitude modulated signal referred to as the "quadrature" signal. The in-phase and quadrature signals are combined in an adder 20 to produce a "QAM" (quadrature amplitude modulated) signal 21. The QAM signal has a frequency spectrum comprised of a 6.36 MHz bandwidth sideband on each side of the QAM carrier, with the contributions from the in-phase and quadrature signals being 90° out of phase.

The QAM signal 21 is, in this form of the invention, fed to an angle modulator 22 to angularly modulate a high frequency (HF) carrier 23 produced by carrier generator 24. The result is a signal 26 comprised of a HF carrier angle modulated by the QAM signal. The frequency spectrum of the signal 26 is comprised of ~ 13 MHz (i.e. 6.5 MHz ± 6.36 MHz) bandwidth first order sidebands (representing the QAM signal) on both sides of the HF carrier 23.

Figures 2, 6:
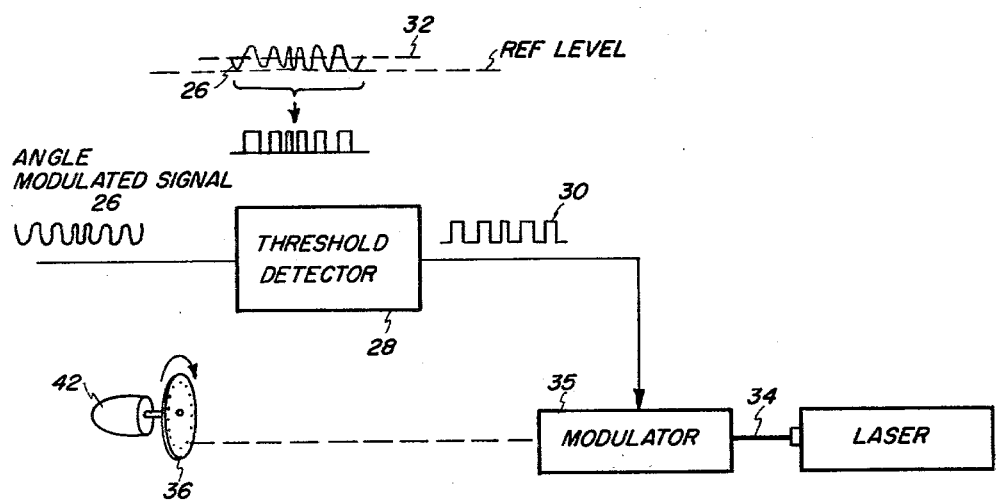
FIG. 6 depicts a table useful in describing the invention.

Referring now to FIG. 2, in the case where a binary (thresholding) recording medium is used, the signal 26 is applied to a threshold detector 28 to form a pulse train 30. The pulse widths are determined by the points at which the signal 26 crosses a threshold signal level 32. The threshold detector 28 is a non-linear device and therefore introduces intermodulation products into its output signal. As discussed in *Video Disc Recording* by M. R. deHann (Television V16, N5 September-October 1976, pages 23–27) these intermodulation products can lead to artifacts in a picture corresponding to the signal output of the threshold detector 28. To minimize such artifacts, the threshold signal level 32 is chosen to produce a pulse train 30 which is symmetrical, i.e., has an average duty cycle of 50 percent. The symmetrical pulse train 30 is applied to a laser modulator 35, a pockels cell for example, to modulate a laser beam 34 for recording on a recording medium in the form of a disc 36 rotatable by a motor 42. In accordance with the present invention, the disc 36 is rotated at a rate to simultaneously record two fields comprising one frame of information per disc revolution. Unlike prior art recording methods wherein recording one frame per disc revolution results in the two fields comprising that frame being recorded sequentially, each field occupying one-half of a closed circular track, the recording method of the present invention results in each field occupying a full circular track—yet both fields are recorded on the same circular track.

It should be appreciated that practicing the invention allows use of the disc recording medium more efficiently than prior art recording methods. In addition, the invention provides improved versatility in readout while maintaining the feature of one recorded frame per disc revolution. This feature is important since it simplifies recorded frame access and readout. The following example will illustrate how the invention accomplishes this:

Suppose one desires to record video signals that correspond to documents that are scanned with a square (symmetric) resolution of 700 lines per image (frame) at a rate of 20 documents per second. Such video signals will have a base bandwidth of about 6.36 MHz (assuming that documents are scanned as two sequential 350-line fields and that each 700 pixel (picture element) active scan line is elongated by 18.7% by the horizontal retrace interval and that the 350-scan line field is elongated by 9.4% by the vertical retrace interval). If the usual prior art method of recording is practiced, the 6.36 MHz video signals would be angularly encoded, say, on a high frequency (HF) carrier having a center frequency of 9 MHz. It is necessary to record an angularly encoded signal on the disc so that the recorded signal will have a high degree of immunity to tracking errors (and focus errors, in the case of an optical disc) which may occur during disc playback and result in spurious modulation of the readback amplitude. In this example, the HF carrier center frequency of 9 MHz is chosen to insure that the lower first order sideband of the angularly encoded recorded signal does not occupy the potentially noisey lowest 1 MHZ (0–1 MHz) baseband spectrum of the disc.

In one frame time (1/20th of a second, i.e., the disc rotates at 20 rps in this case) an average of 450,000 cycles of the HF carrier will occur. Thus, 450,000 marks recorded on the disc will correspond to one recorded frame. Assuming, for the sake of this example, that 1.5 microns is the minimum usable average mark-to-mark spacing along a recorded track on the disc medium for the particular angular encoding scheme used, the minimum length of a prior art recorded track that would correspond to a recorded frame is 675 mm. With one frame being recorded as one closed circular track or one turn of a concentric spiral track on the disc, the minimum recorded disc radius would be 107.4 mm (4.23"). This means that a twelve inch diameter disc having a maximum recording radius of 145 mm would be capable (in the prior art scheme under discussion) of storing 18,800 frames if adjacent tracks on the disc are separated radially by 2 microns.

In general, it can be shown that if a disc turns at a constant rotational speed so that the recorded marks are spread further apart along the recorded track at larger radii, and given minimum mark-to-mark and track-to-track spacings, the most efficient use of the recording medium will occur when the inner recorded radius is one-half the maximum recorded radius. Thus, if 12 inch diameter discs are to be used (145 mm maximum recording radius), one would like to be able to record an entire frame on a track having a 72.5 mm radius. The prior art recording method described above would require a disc having a diameter of almost 17" if optimum usage of the disc area is to be made.

Another method of usefully storing information on a disc of reasonable diameter would be to record the frame of information on two adjacent circular (or spiral turn) tracks such that each track contains only one of the two fields of information that make up the frame (during recording the disc would rotate at twice the angular velocity as in the above example). Thus, to record the 6.36 MHz baseband video signal described above would require that the innermost recorded track contain only 225,000 recorded marks spaced at 1.5 microns along the recorded track direction; the minimum recorded track radius would be 53.7 mm. However, (i) the fully recorded 12" diameter disc would contain at most 36,250 recorded tracks spaced at 2 microns in the radial direction in its 72.5 mm wide recording annulus, and (ii) since a pair of tracks would be required to make up one frame, such a 12" diameter disc would contain 18,125 frames of information. Of course, the readout head would be required to alternately access each of the pair of tracks that constitute a single frame and line sequential readout would be impractical with a single readout head.

With the above-noted disc dimensions, and track-to-track and mark-to-mark spacings in mind, the efficiencies inherent in the practice of the invention will become evident from the following: The 6.36 MHz video signal referenced in connection with FIG. 1 is first QAM encoded onto a 6.5 MHz carrier. The QAM encoded signal is then angularly modulated onto a HF carrier having a center frequency of, say, 15 MHz. As before, the HF carrier center frequency must be sufficiently high to insure that the lower first order sideband of the angularly encoded signal recorded on the disc does not occupy the potentially noisey 1 MHz baseband spectrum of the disc. Since both fields that make up the frame of information are simultaneously present in the QAM signal, each frame of information is recorded in 1/40th of a second (i.e., the disc spins at 40 rps) and during this time 375,000 cycles of the 15 MHz carrier will occur (on average). Thus, 375,000 recorded marks, having an average in track spacing of 1.5 microns, constitute one recorded frame of information. The minimum recorded track radius is, therefore, 89.52 mm (3.525") and, if radial track spacings of 2 microns are used, 27,738 tracks can be recorded in an annular area extending from 89.52 mm to 145 mm in radius on a 12" diameter disc. Since each track contains two simultaneously recorded fields, this corresponds to 27,738 frames of information. Clearly, by practicing the invention, the number of frames recorded in a useful fashion on a 12" diameter disc is significantly increased. Moreover, such recorded frames can be read out in a field sequential or line sequential mode with a single head at any desired data rate (e.g., by varying the disc rotation rate during playback).

To facilitate location of a particular frame, the disc may be provided with an index band containing frame identification and location information. For example, if each frame of information comprises a bank check, then the account number, check number, etc., and the track location on the disc may be digitally recorded in the index band. Allowing 160 spots (bits) per frame identification and location, and assuming the index band is located at a 60 mm radius, about 36 tracks are required for indexing up to 35,000 frames. To find a particular check, it is only necessary to scan the index band to find its corresponding track location, and then access and read the indicated track. This whole procedure can be accomplished in seconds, as opposed to the minutes it would take, on the average, to scan each track until the desired track is located.

Playback

The method and apparatus employed for playback will vary depending upon the application. Three applications are considered below:

(1) playback for video display,
(2) playback for hard copy reproduction using a dual-line printer, and
(3) playback for hard copy reproduction using a line-sequential printer.

Video Display

Figure 3:
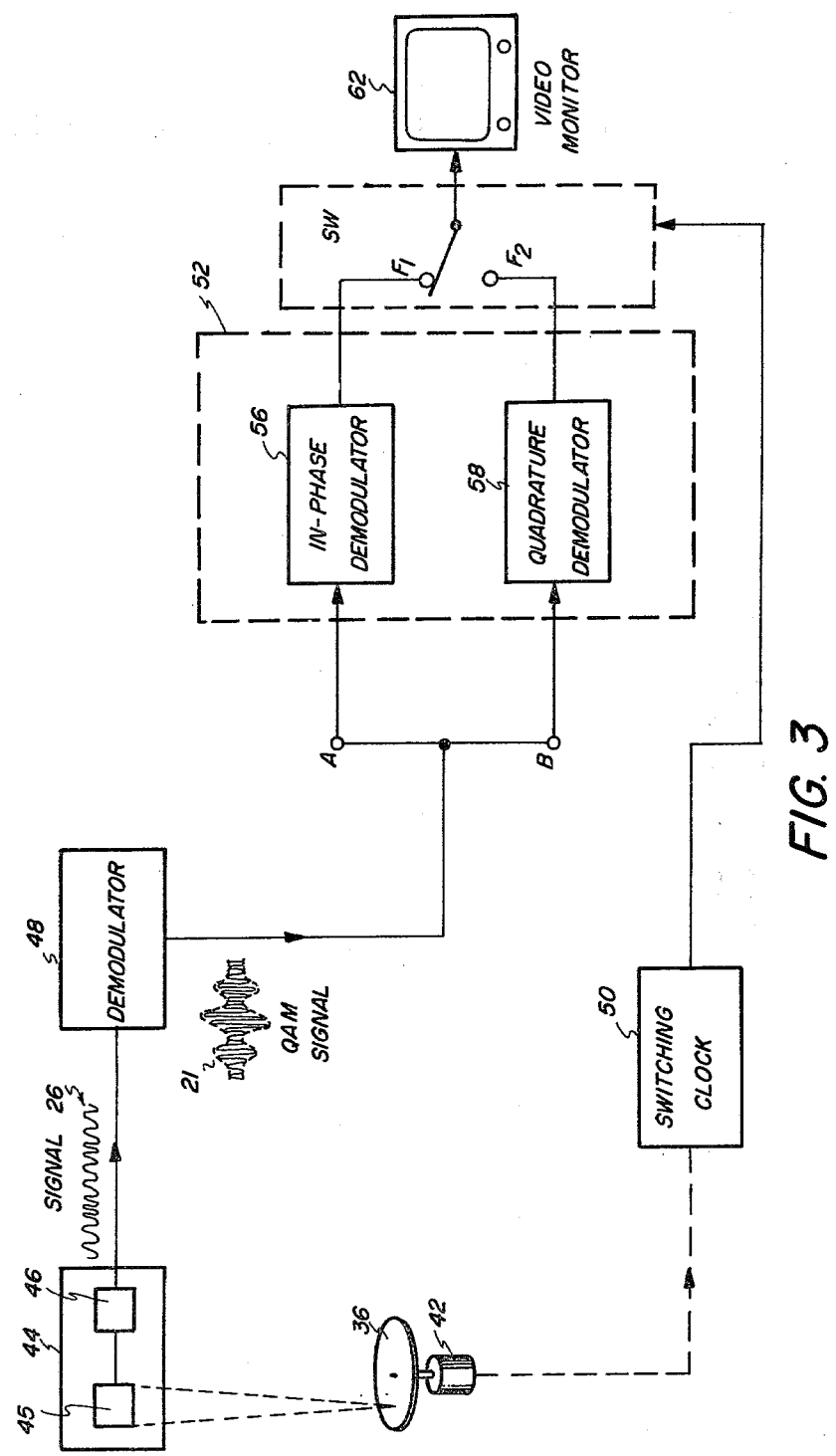
FIG. 3 shows a circuit in block diagram form and illustrates the playback of recorded information for video display.

To read a frame of information from the disc 36 and display the frame on a video monitor, a circuit such as shown in FIG. 3 is used. During playback, disc 36 is rotated by the motor 42. The rate of disc 36 rotation is chosen to be equal to the field rate of the video monitor. A playback device 44, which includes playback light source and optics 45 and a signal processing circuit 46, reproduces from the disc 36 the originally recorded signal 26. The signal 26 is applied to a demodulator 48 to reproduce the original QAM signal 21. The QAM signal is comprised of information from fields 1 and 2 in respective quadrature amplitude modulation of the QAM carrier. To extract the field information from the QAM signal and process it to a form compatible with the video monitor, the QAM signal is applied to input terminals A and B of a QAM demodulator circuit 52 (similar to the chrominance demodulation circuits employed in color television receivers, for example). The QAM demodulator circuit 52 is comprised of an in-phase demodulator circuit 56 and a quadrature demodulator circuit 58. A switch SW, in response to a clock 50, alternately applies the two demodulated outputs of the circuit 52 to a monitor 62. Thus, the demodulated in-phase signal (field 1, signal F1) is applied to the monitor 62 during one disc revolution; during the next disc revolution the switch SW applies the demodulated quadrature signal (field 2, signal F2) to the monitor. The input to the monitor 62, therefore, is the original field sequential signal, i.e., the field 1 signal $F_1$ followed by the field 2 signal $F_2$. This process is repeated to continually supply the video monitor 62 with a selected frame of document information for visual display.

Hard Copy Reproduction From A Dual-Line Printer

A dual-line printer prints two lines of document information at a time, starting at the top of a page and proceeding to the bottom. For example, a dual-line printer simultaneously prints lines 1 and 2, then 3 and 4, and so on. It will be apparent that the field sequential signal output of the circuit shown in FIG. 3 is not compatible with such a printing device because the fields are supplied sequentially for interlaced display on a video monitor. The circuit of FIG. 4 is a circuit which provides an output signal having a format compatible with a dual-line printer.

Figure 4:
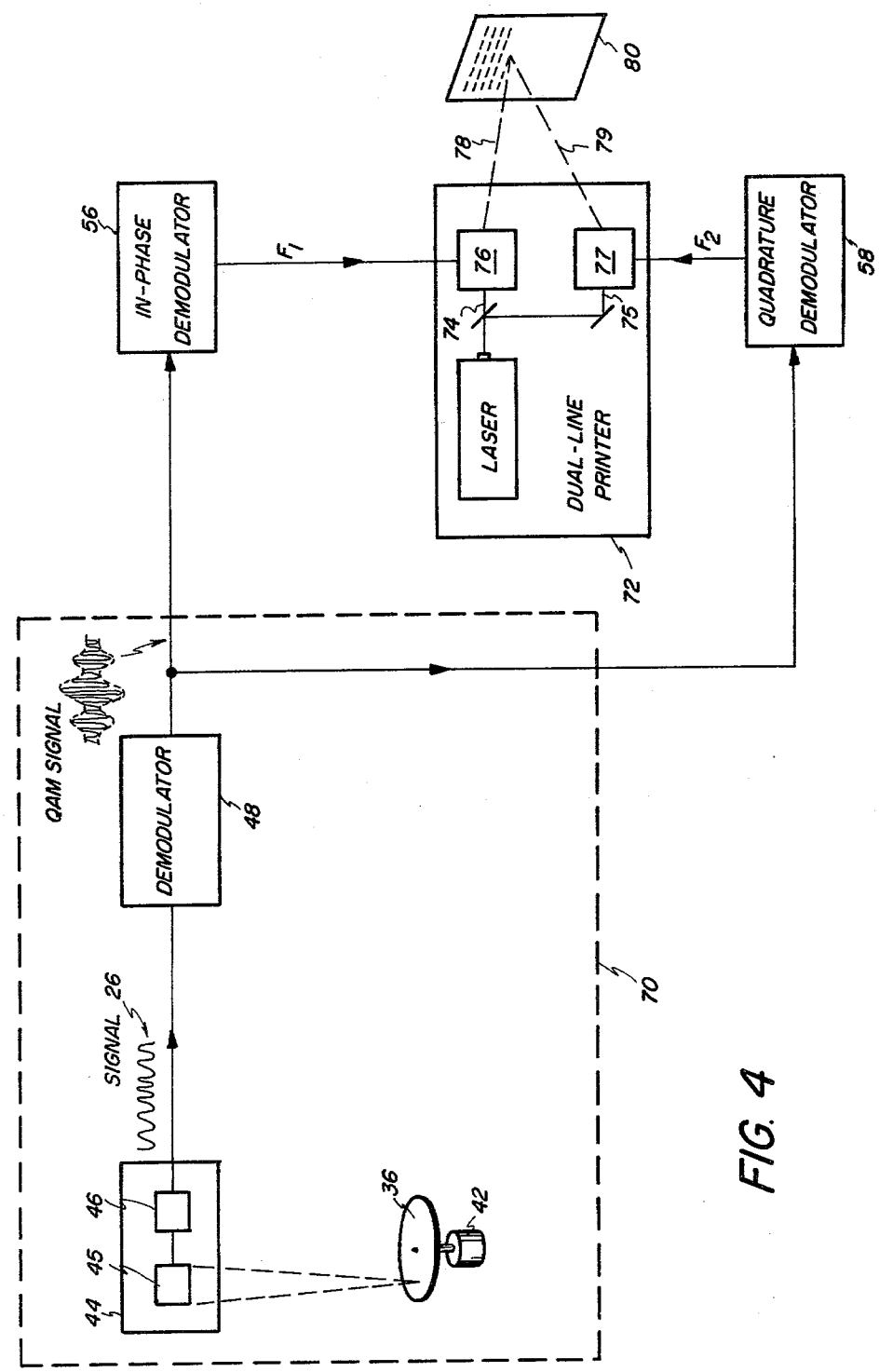
FIG. 4 is a diagram of a circuit in block form and illustrates the playback of recorded information for hard copy reproduction by a dual-line printer.

Referring to FIG. 4, the operation of the circuit enclosed within the dotted box 70 has already been described in connection with FIG. 3 and need not be repeated. In the embodiment of FIG. 3, the in-phase signal (field 1) is demodulated upon one revolution of the disc 36, and the quadrature signal (field 2) is demodulated upon the next revolution. In the embodiment of FIG. 4, however, both the in-phase and quadrature signals are simultaneously demodulated in one revolution of the disc 36. This result is achieved by applying the QAM signal simultaneously to both the in-phase and quadrature demodulators 56, 58, respectively. The output signals $F_1$ and $F_2$ of the in-phase and quadrature demodulators 56, 58 correspond to field 1 (odd lines) and field 2 (even lines), respectively. The field information signals $F_1$ and $F_2$ are applied to a dual-line printer device 72.

The dual line printer 72 is of a type having two recording beams 74, 75 with each beam modulated by a separate modulator 76, 77. The field information signals $F_1$ and $F_2$ are applied directly to the modulators 76, 77 respectively. The result is that the laser writing beams 78, 79 produce, by line pairs, a hard copy reproduction 80 of the played back frame of information. The rate of rotation of the disc during readout is chosen to match the speed of the printer 72 (provided, of course, that the demodulators 56, 58 are operated acordingly). One revolution of the disc 36 is sufficient to provide the hard copy reproduction 80.

Hard Copy Reproduction From A Line-Sequential Printer

A line-sequential printer prints information, line-by-line (i.e., line 1, line 2, line 3, and so on), starting at the top of a page and proceeding to the bottom. The circuit shown in FIG. 5 provides an output signal having a form compatible with such a printer. The portion of the circuit enclosed by the dotted box 71 has been largely described in connection with FIG. 4 and is not here repeated. In the embodiment of FIG. 5, additional circuitry is provided to process the field signals $F_1$ and $F_2$ to a form compatible with a line-sequential printer 75. The signal $F_1$ is applied to an input terminal 90 of a line buffer 92 (described in more detail below), while the signal $F_2$ passes through a delay line 94 before being applied to an input terminal 96 of a line buffer 98 similar to line buffer 92. The time delay $\tau$ introduced by the delay line 94 is equal to one-half of the time it takes for a simultaneous pair of field lines to be played back from the disc 36. For example, assume the disc 36 rotates at such a rate that it takes 2 ms for one pair of field lines to be simultaneously played back. The time delay $\tau$ is then equal to 1 ms.

Each of the line buffers 92 and 98 accept field lines at the rate of one line per 2 ms and dump (at output terminals 100 and 102, respectively) the lines at the rate of one line per 1 ms. The printer device is thus chosen to print at a rate of one field line per 1 ms, i.e., at a rate which is twice as fast as the field line playback rate. (It will be apparent that the numbers chosen above are merely illustrative, and that the playback rate can be made faster or slower to be compatible with a particular printer device.)

Referring to the Table of FIG. 6, at time $t=0$ the signal at terminal 90 is the beginning of field line 1. At $t=2\tau$ field line 1 has been read into the line buffer 92 and is dumped in a time duration equal to $\tau$ at output terminal 100. The process is repeated for each of the field lines of signal $F_1$. The output signal at terminal 100, for any given time, is shown in the Table. The signal $F_2$ (even field lines) is processed in a similar manner by the line buffer 98, except that such operation is delayed by a time $t=\tau$ due to the delay line 94. The Table shows the signals at the input and output terminals 96 and 102 as a function of time. From the Table, it is seen that the signals at the buffer output terminals 100 and 102 alternate between the odd and even field lines respectively, each line being dumped in a time equal to $\tau$. A switch SW' switches between terminals 100 and 102 to provide a line-sequential output signal $S_o$, at terminal 104, which is comprised, in alternation, of lines of information from the two fields (line 1, line 2, line 3, line 4, . . . ) and is therefore compatible with the line-by-line printer device 75, which prints the lines in sequence starting at the top of a page and proceeding to the bottom.

The line buffers 92 and 98 may comprise analog shift registers which read in at one clocking rate and are read out at a second clocking rate. As is known, analog shift registers may take a variety of forms such as charge coupled and charge injection devices, various serially disposed sample-and-hold circuits, and even A/D and D/A converters which serve as input to and output from digital shift registers. U.S. Pat. Nos. 3,931,638 and 3,932,888, which are hereby incorporated by reference, disclose examples of the use of analog shift registers with two clock rates, one clock rate controlling the rate at which a video signal is read into a register, the other clock rate controlling the readout rate.

FIG. 5a shows in more detail one embodiment of the line buffer 98. The signal at the input terminal 96 is read into an analog shift register 110 at a clock-in rate controlled by the clocking signal $\phi_A$ produced by a clock logic circuit 112. The signal thus stored in the analog shift register 110 is read out at a clock-out rate controlled by the clocking signal $\phi_B$. The clocking signals $\phi_A$ and $\phi_B$ are such that one line of information is read into the analog shift register 110 in 2 ms, and is read out in 1 ms. Obviously, the analog shift register 110 is chosen to have ample capacity to handle the signals being clocked in and out. The clock logic circuit 112 may be coupled to the printer device 75 to provide proper synchronization, or may be free running if the application so permits.

The invention has been described in detail with particular reference to preferred embodiments thereof, but it will be understood that variations and modifications can be effected within the spirit and scope of the invention. For example, the above description has assumed that each document is recorded as one frame and that each frame is comprised of two interlaced fields. It will be apparent that, insofar as the present invention is concerned, any two signals which contain the document information can be subjected to the quadrature amplitude modulation process of the present invention. As another example, while the particular form of recording referred to above has been in the form of optical recording, it will be apparent that other forms of recording are also useful in the practice of the invention, e.g., magnetic recording, or pressed optical discs, etc.

What is claimed is:

1. A method of recording a video frame of information on a recording medium, said frame being comprised of two fields, said method comprising the steps of:
    quadrature amplitude modulating the two fields of information on a carrier to produce a QAM signal; and recording said QAM signal on said recording medium,
thereby forming a single track recording comprised of both fields of said frame of information.

2. The method as claimed in claim 1 wherein said recording medium is a disc having a rotary axis, and wherein said method includes the step of so rotating said disc during recording that one full frame of information is recordable per revolution of the disc.

3. A method of playing back a video frame of information comprising two fields recorded on a recording medium, said frame of information being recorded in the form of a carrier frequency that has been modulated in quadrature by said two fields of information, said method comprising the steps of:

repeatedly playing back the recorded frame of information; and demodulating said played back frame of information to produce, in alternation, information signals corresponding to said two fields.

4. The method as claimed in claim 3 wherein said recording medium is a disc having a rotary axis substantially perpendicular to the recording surface of the disc, said disc having one frame of information recorded per turn thereof, and said method includes the steps of rotating said disc during playback and demodulating the recorded information of said disc upon successive revolutions of said disc to produce a field sequential signal comprising, in alternation, said two fields of information.

5. A method as claimed in claim 4 further comprising the step of applying said field sequential signal to a video monitor to provide a video display of said frame of information.

6. A method of playing back a video frame of information comprising two fields recorded on a recording medium, said frame of information being recorded in the form of a carrier that has been modulated by a signal representative of said two fields of information in quadrature amplitude modulation, said method comprising the steps of:

demodulating said modulated carrier to produce said quadrature amplitude modulation representative signal, and thereafter demodulating said quadrature amplitude modulation representative signal to produce simultaneously a pair of information signals corresponding to said first and second fields.

7. A method as claimed in claim 6 wherein said recording medium is a disc having one frame of information recorded per turn thereof, and wherein said method includes the steps of rotating said disc while signal demodulating.

8. A method as claimed in claim 7 further comprising the step of applying said field information signals to a dual-line printer device to provide a hard copy reproduction of said frame of information.

9. A method of playing back a video frame of information comprising two fields recorded on a recording medium, said frame of information being recorded in the form of an angle modulated carrier that has been modulated by said two fields of information in quadrature amplitude modulation, said method comprising the steps of:

demodulating said modulated carrier to produce a quadrature amplitude modulation signal comprised of a pair of information signals in quadrature and corresponding to said first and second fields; and electronically processing said quadrature amplitude modulation signal to produce said pair of information signals.

10. A method as claimed in claim 9 wherein: said recording medium is a disc having said frame of information recorded thereon in a single one-turn track thereof, one of said two fields containing odd line information and the other of said fields containing even line information; said method including the steps of:

producing said quadrature amplitude modulation signal in a single revolution of said disc, and electronically processing said quadrature amplitude modulation signal so as to convert said information signals into a line sequential output signal comprised, in alternation, of odd and even lines of information from said two fields, respectively.

11. A method as claimed in claim 10 further comprising the step of applying said line-sequential signal to a line-sequential printer device to produce a hard copy reproduction of said frame of information.

12. A disc storage device having a frame video of information comprising two fields recorded thereon along a substantially circular track thereof, said frame of information being in the form of a carrier angle-modulated by said two fields of information in quadrature amplitude modulation.

* * * * *